Aug. 16, 1949.  S. B. MARTIN  2,479,076
PUSHER

Filed June 16, 1945  2 Sheets-Sheet 1

INVENTOR.
STODDARD B. MARTIN
BY Richey & Watts
ATTORNEYS

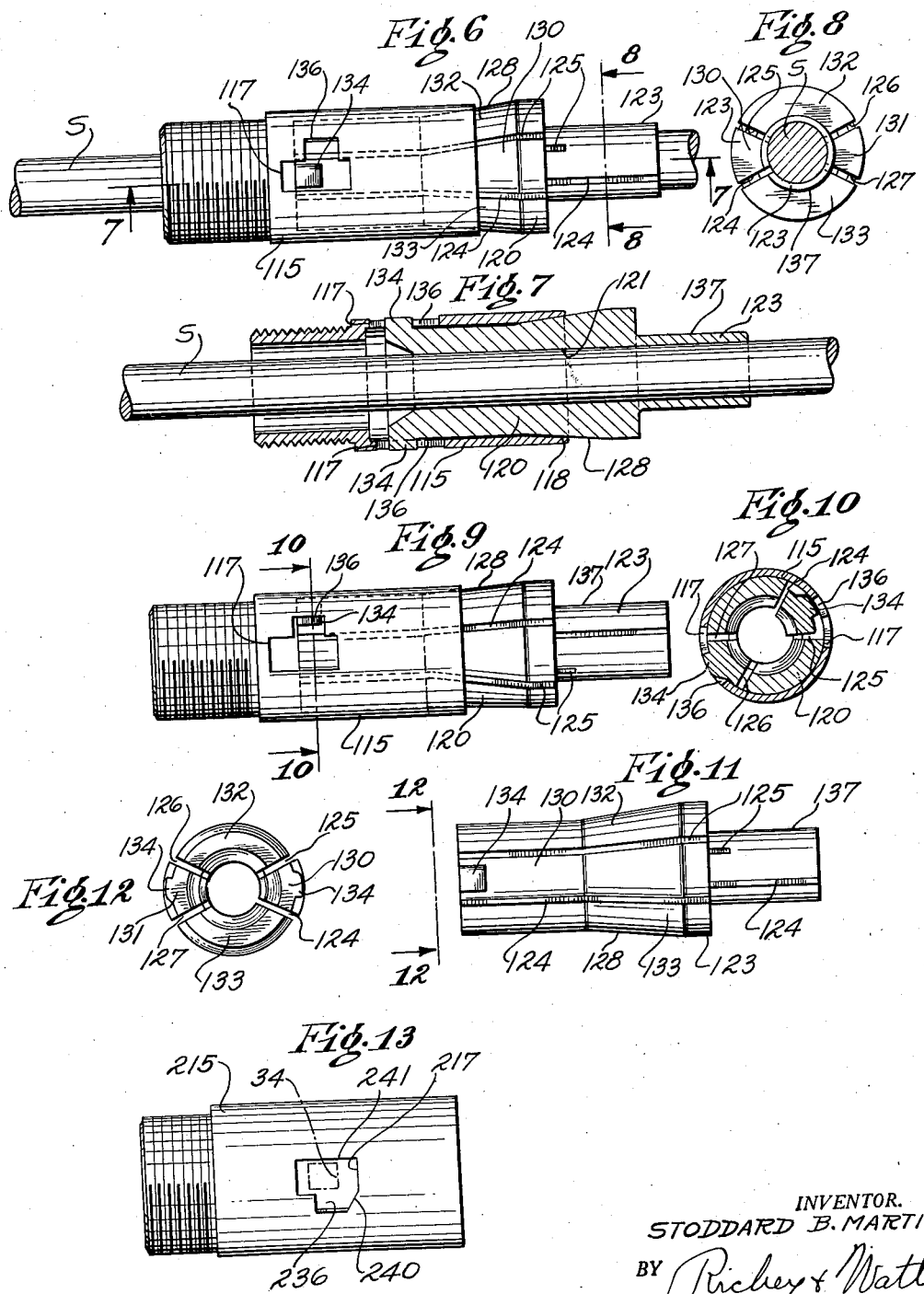

Patented Aug. 16, 1949

2,479,076

UNITED STATES PATENT OFFICE 2,479,076

PUSHER

Stoddard B. Martin, Cleveland, Ohio; Central National Bank of Cleveland, executor of said Stoddard B. Martin, deceased, assignor to Margaret J. Martin Application June 16, 1945, Serial No. 599,875

2 Claims. (Cl. 279—50)

1

This invention relates to pushers for automatic screw machines and the like.

The spindle of an automatic screw machine is ordinarily a hollow tube surrounding a collet tube which carries a collet to grip and rotate a bar of stock fed axially therethrough. At the end of each cycle of operations of the machine, the projecting end of stock is cut off from the bar, the collet opens, a new length of stock is fed forwardly and the collet is again closed to grip the stock and repeat the cycle of operations. The stock is ordinarily fed forward by a pusher or feed finger carried by a reciprocating pusher tube disposed within the collet tube.

It is desirable to construct the pusher as a master pusher; that is, with removable pads or bushings which can be assembled into a single shell to grip stock of various sizes. Many difficulties have been encountered however, with such constructions. It is difficult to mount the removable pads or bushing in place in the pusher shell so that they are easily removed and replaced and securely held in position during operation, and so that the fastening means does not subtract from the limited space available within the collet tube and thus limit the maximum size of stock that may be used in the machine. It is also desirable in some machines and with some classes of work to provide means for increasing the grip of the pusher on the feeding stroke, so that accurate and positive feeding is possible without marring the bar or excessively wearing the bearing surfaces of the pusher during the retracting stroke.

The principal object of the present invention is to mount removable bushings in a tubular pusher member in such a manner that the bushings are securely held in position during operation of the machine and at the same time may be readily removed and replaced by a simple manual manipulation and without the aid of any special tools. Other objects are to improve the gripping characteristics of removable bushings for pushers; to obtain at the same time a wedging gripping action on the feeding stroke, a secure fastening of the removable bushing in place and ease of removing and replacing the bushing; and to avoid limiting the maximum diameter of the stock that may be used in the machine.

Other objects and advantages and the manner in which all the various objects are realized will appear in the following description of preferred embodiments of the invention.

In the accompanying drawings:

2

Fig. 6 is a view in side elevation of a somewhat different form of pusher embodying the present invention;

Fig. 7 is a longitudinal section taken substantially on the line 7—7 of Fig. 6;

Fig. 8 is an end elevation taken on the line 8—8 of Fig. 6;

Fig. 9 is a view of the pusher shown in Fig. 6 with the stock removed and the bushing turned to begin removal of the bushing from the shell;

Fig. 10 is a cross section taken on the line 10—10 of Fig. 9;

Fig. 11 is a side elevation of the bushing of Fig. 6 removed from the shell;

Fig. 12 is an end elevation taken on the line 12—12 of Fig. 11; and

Fig. 13 is a side elevation of a shell embodying a further modification.

Figure 1:
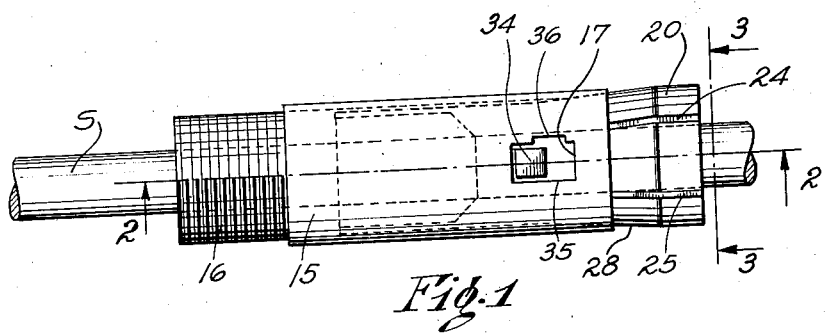
Fig. 1 is a view in elevation of one form of pusher embodying the present invention.

Referring first to the embodiment shown in Figs. 1 to 5, inclusive, the reference numeral 15 designates a shell having a threaded end 16 adapted to be secured at the end of a pusher tube. The shell is formed with a pair of oppositely disposed apertures 17 cut through the wall of the shell to cooperate with holding means on the bushing. The bore at the forward end of the shell is preferably tapered outwardly as indicated at 18.

A bushing 20 is arranged to be held in position within the shell 15 and to grip the stock to be fed. In the form shown in Figs. 1 to 5 the bushing has a bore 21 to fit over a particular size of stock to be fed and a counterbore 22 at its rear end forming a tubular spring portion 23 which may be of any thickness desired to provide the correct spring tension. The bushing 20 is cut completely through by a longitudinal slot 24 and has slots 25, 26 and 27 extending into the same from its front end and terminating short of the rear end. Through the major portion of its length the exterior surface of the bushing 20 is preferably cylindrical and of a size to be received within the bushing 15. Near its forward end the exterior surface tapers outwardly as indicated at 28 to cooperate with the front end of the shell 15 and produce a wedging action.

The slots 24 and 25 are arranged relatively close to each other, as are the slots 26 and 27, so that the front end of the bushing embodies relatively narrow segments 30 and 31 separated by wider segments 32 and 33. The segments 30 and 31 are provided with radially projecting lugs 34 adapted to fit within the openings 17 in the shell.

The bushing 20 is preferably constructed of steel or the like capable of being hardened and taking a spring temper. After being bored and machined the slots 24, 25, 26 and 27 are cut in the bushing. Thereafter the spring portion 23 is closed in slightly and the segments 32 and 33 are bent towards each other, the segments 30 and 31 being bent outwardly from each other so that the bushing has the shape shown in Fig. 5. The bushing is then hardened to the degree of hardness desired for the bearing surface of the bore 21 and the taper 28, and the spring portion 23 is then drawn to a spring temper. The bushing thus resiliently retains the shape given to it before hardening.

To assemble the bushing within the shell the ends of the narrow segments 30 and 31 are gripped in the operator's fingers and pressed together sufficiently to permit the lugs 34 to enter the open end of the shell 15, and the bushing is then simply slipped rearwardly into the shell. When the lugs 34 are in alignment with the opening 17 the segments 30 and 31 are released and spring outwardly so as to press against the inner surface of the shell 15 and hold the lugs 34 in position in the openings 17. The relatively wide segments 32 and 33 remain sprung inwardly from their original diameter.

When a length of stock S is inserted in the pusher the segments 32 and 33 are forced outwardly so that each of the segments of the bushing occupies substantially its original position, the segments 32 and 33 resiliently gripping the stock. In the illustrated embodiment, the resilient gripping force is derived primarily from the fact that the bushing is cut completely through by the slot 24 and is closed in from its original diameter. This arrangement greatly reduces the tendency of the spring portion to fatigue.

Figure 2:
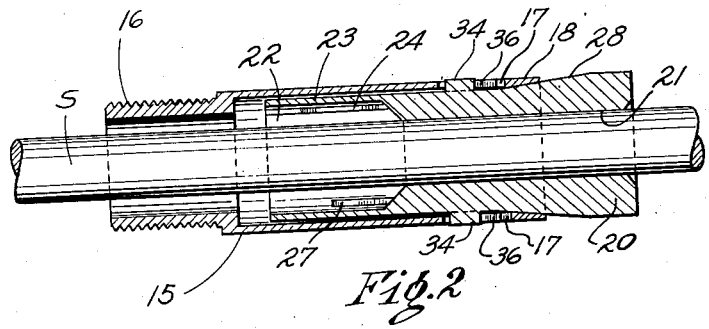
Fig. 2 is a longitudinal section taken substantially on the line 2—2 of Fig. 1.
Figure 3:
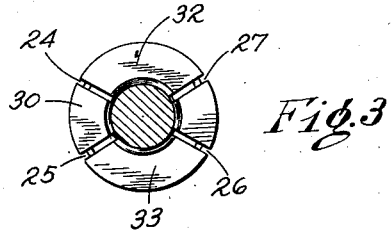
Fig. 3 is an end elevation of the pusher taken on the line 3—3 of Fig. 1.
Figures 4, 5:
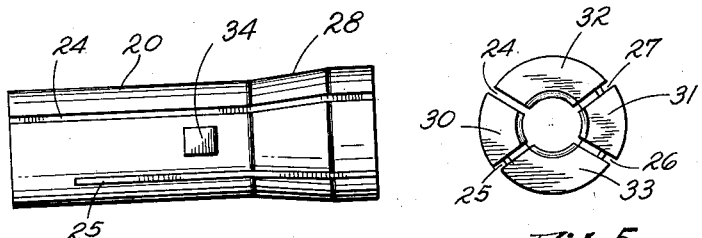
Fig. 4 is a view in side elevation of the bushing removed from the pusher shell.
Fig. 5 is an end elevation of the bushing shown in Fig. 4.

On the retracting stroke of the machine the shell 15 is pulled rearwardly, or to the left as shown in Figs. 1 and 2 and the forward edges of the opening 17 engage the forward edges of the lugs 34 and slide the bushing rearwardly over the stock S against the tension of the segments 32 and 33. On the forward or feeding stroke the shell 15 moves forwardly or to the right as shown in Figs. 1 and 2, until the forward end 18 of the shell engages the tapered portion 28 of the bushing. The forward end of the shell then wedges upon the tapered surface 28 of the segments 30, 31, 32 and 33, pressing each of the segments against the stock to increase the grip of the bushing, thus providing a strong feeding grip which resists slippage on the feeding stroke and prevents rebounding when the forward end of the stock being fed strikes the stock gauge.

In the usual automatic screw machine or the like the stock is gripped and rotated by the collet after the feeding stroke and during the retracting stroke of the pusher. In the illustrated embodiment the stock is intended to be rotated in a clockwise direction as viewed from the rear end of the pusher tube, or the left hand end as seen in Figs. 1 and 2. The bushing is rotated with the stock by reason of the resilient grip of the segments 32 and 33, bringing the lugs 34 into engagement with the lateral edges 35 of the openings 17 and thus transmitting the rotation to the shell 15 and the pusher tube.

To permit the bar of stock to be removed from the machine when desired the side edges of the openings 17 opposite the edges 35 are formed with notches 36 adapted to receive the lugs 34. When it is desired to remove the bar the rear end may be grasped and rotated in a counter clockwise direction to bring the lugs 34 into the recesses 36. The stock can then be pulled rearwardly out of the pusher against the spring grip of the segments 32 and 33, the engagement of the lugs 34 in the recesses 36 preventing the tapered surfaces 25 from being pulled into wedging engagement with the forward end 18 of the shell.

To remove the bushing from the shell it is merely necessary to remove the stock S, grip the narrow segments 30 and 31 with the fingers and force them together a sufficient distance to permit the lugs 34 to clear the forward edges of the openings 17. The bushing can then be slipped forwardly out of the shell.

It will be understood that a plurality of bushings having various sized bores 21 may be provided for each shell so as to adapt the pusher to feed various sizes of stock. The spring portion 23 may, however, be maintained of the same dimension in each of the different sizes of bushing so that the spring tension of the bushing is constant regardless of the size of stock being gripped. On stock of the maximum capacity of the machine the bore 21 may be the same or substantially the same diameter as the counterbore 22.

In the form of the invention shown in Figs. 6 to 12, inclusive, the shell 115 is provided with openings 117 positioned near the rear end of the bushing. The bushing 120 is a unitary tubular member formed with a bore 121 and an externally reduced spring section 123 located at the forward end of the bushing. The bushing is split longitudinally by a slot 124 and is formed with slots 125, 126 and 127 extending into the bushing from its rear end and terminating short of its front end. As in the embodiment shown in Figs. 1 to 6 the slots are positioned to provide opposite relatively narrow segments 130 and 131 separated by relatively wide segments 132 and 133. The segments 130 and 131 are formed with lugs 134 at their rear ends which are arranged to be received in the openings 117 in the shell. The bushing is provided externally near its forward end with a tapered portion 128 adapted to cooperate with the forward end 118 of the shell to provide a wedging grip on the stock S.

As in the embodiment shown in Figs. 1 to 5, the bushing is bored and machined to shape and the slots 124, 125, 126 and 127 are cut therein. Thereafter the spring section 123 is closed in, the wide segments 132 and 133 are bent toward each other, and the narrow segments 130 and 131 are bent outwardly away from each other into the position illustrated in Fig. 12. The entire bushing is then hardened to the desired degree of hardness and the spring section 123 is drawn to a spring temper.

To assemble the bushing 121 in the shell 115 the rear ends of the segments 130 and 131 are pressed together with the fingers until the lugs 134 will enter the forward end of the shell 115.

The bushing is then pushed rearwardly in the shell until the lugs 134 snap into the openings 117. When a length of stock S is inserted in the pusher the segments 132 and 133 are forced outwardly and provide a spring grip upon the stock. In feeding, the shell 115 is advanced until its forward edge 118 engages the tapered surface 128, wedging all of the segments onto the stock as in the embodiment shown in Figs. 1 to 5.

The openings 117 are provided with lateral recesses 136 which function like the recesses 36 of the shell 15 in permitting removal of the stock while preventing engagement of the wedging surfaces 118 and 128. The recesses 136 also cooperate in the removal of the bushing from the shell and for this purpose one of the recesses 136 is slightly deeper than the other. As shown in Figs. 9 and 10, when it is desired to remove the bushing from the shell the stock is first removed from the bushing and the bushing is turned to bring the lugs 134 into the recesses 136. One of the lugs 134 engages the lateral edge of its recess 136 while the other lug 134 is still spaced from the edge of its recess 136. The first lug 134 is then pressed inwardly with a screw driver or with the fingers until it will slip inside the shell 115 and the bushing is further turned to bring the other lug 134 into engagement with the lateral edge of its recess 136, as shown in Fig. 10. The remaining lug 134 is then pushed inwardly while the bushing is continued to be turned until both lugs are positioned within the shell, after which the bushing may be pulled out of the front end of the shell.

In other respects the operation of the form shown in Figs. 6 to 12 is substantially the same as that of the form shown in Figs. 1 to 5. The bore 121 is made of a size to fit one particular size of stock of the series of sizes to be accommodated by a single pusher. The spring section 123 is formed by a continuation of the bore 121 and is reduced in thickness to any desired extent by cutting away its exterior surface, as indicated at 137. Thus the spring tension may be maintained constant regardless of the size of stock to be gripped by a particular bushing. For stock of the maximum capacity of the machine the spring section 123 may be reduced but slightly, if any, from the external diameter of the bushing 120.

With this arrangement the spring tempered section 123 bears upon the stock at all times simultaneously with the hardened bore 121. Excessive wear of the spring portion 123 is prevented by the hardened portion of the bore 121. However, the spring portion 123 is capable of gripping the final end of a length of stock with sufficient force to feed the same as long as any portion of the stock remains within the bushing. When the last portion of the stock has been gripped by the collet and the bushing slips off of the same on the next retracting stroke the spring section 123 is then aligned with the end of the piece of stock and engages and pushes the same out of the collet on the next feeding stroke. Thus this arrangement minimizes waste and helps to dispose of the short end of the bar without danger of jamming the feed mechanism.

On some types of machines it has been found that when the collet releases the stock and before the pusher advances on its feeding stroke there is a tendency for the stock to slow down in its rotation and for the pusher to overrun the stock. In such machines there is sometimes danger of the lugs 134 entering the recesses 136 on the feeding stroke so that the wedging surfaces are held out of engagement and only the resilient grip of the bushing is available to feed the stock.

On such machines this difficulty can be avoided by the modification shown in Fig. 13. In this embodiment the shell 215 is provided with oppositely disposed openings 217 to receive the lugs 34 or 134. The openings 217 are provided with recesses 236 in their side edges against which the lugs 34 are normally turned by the rotation of the stock. At their forward ends the recesses 236 are joined to the openings 217 by inclined edges 240.

With this arrangement when the stock is gripped and rotated by the collet and the pusher tube is drawn rearwardly on its retracting stroke the lugs 34 first turn into the recesses 236 and are then pulled back into the openings 217 by the retracting force and the engagement of the lugs 34 with the inclined edges 240. When the collet is opened the stock begins to decelerate and the shell 215 tends to overrun the stock so as to bring the straight side edges 241 of the openings 217 against the lugs 34. When the pusher tube then advances the lugs move rearwardly in the openings 217 along the straight edges 241 so that the wedging surfaces may be brought into engagement. When it is desired to remove a bar of stock from the machine it is only necessary to grasp the bar, turn it to the right instead of to the left as in the embodiments previously described and, when the lugs have been engaged in the recesses 236, pull the bar rearwardly out of the machine.

In each of the forms of bushing disclosed it will be apparent that the force required to deflect the lug carrying segments 30 and 31 or 130 and 131 may be regulated by varying the circumferential width of these segments. Thus the bushings can be constructed in all sizes so that they can be readily removed and replaced by simple manual manipulation. A circumferential width of about 45° is preferred for these segments 30, 31 and 130, 131, but they may be wider with weaker spring sections. Preferably these segments are less than 90° in width. Similarly in each of the embodiments disclosed the shell 15, 115 or 215 may be circumferentially continuous without danger of the bushing becoming separated from the shell when no stock is gripped in the pusher. This results from the fact that the lug carrying segments are bent outwardly from their normal contour so that they resiliently press against the inside of the shell and hold the lugs in the openings in the shell when no stock is gripped in the pusher. At the same time all of the segments act as stock gripping segments when the wedging surfaces engage on the feeding stroke.

It will, of course, be understood that the invention is not limited to the precise number and arrangement of slots disclosed but that any desired slotting arrangement may be used which will retain the desired features of the invention. Many other modifications and rearrangements of parts may be resorted to without departing from the scope of the invention as defined in the following claims.

I claim:

1. A pusher comprising a tubular shell having an opening through the wall thereof and a bushing adapted to fit within said shell to grip stock to be fed, said bushing comprising a tubular member including a resilient portion and having a plurality of longitudinal slots extending inwardly from one end thereof forming a plurality of segmental portions integral with said resilient portion, one of said segmental bushing portions having a radially projecting lug adapted to fit within the opening in said shell, said one segmental portion being bent outwardly with respect to other of said segmental portions so that said lug is retained in said opening when no stock is disposed within said bushing and other of said segmental portions being bent inwardly so as to form diametrically opposed surfaces that grip resiliently the stock to be fed, said shell and all of said segmental portions being formed with cooperating wedging surfaces adapted to engage when said shell moves in one direction with respect to said bushing to force all of said segmental portions inwardly against stock being fed.

2. In a pusher, a tubular shell having an opening through the wall thereof, a longitudinally split resilient bushing adapted to fit within said shell and to grip stock to be fed, said bushing being formed with a plurality of slots extending into the same from one end forming a plurality of segmental gripping portions, two of said segmental portions being bent inwardly to form diametrically opposed stock gripping surfaces, another of said segmental portions carrying a radially projecting lug adapted to fit within the opening in said shell and being bent outwardly from said bushing with respect to said first named segmental portions so as to maintain said lug positioned in said opening when no stock is disposed in said bushing, said split bushing having an outer diameter smaller than the inner diameter of said shell with no stock in the bushing, said shell and all of said segmental portions being formed with cooperating wedging surfaces arranged to force said segmental portions radially inward against stock being fed when said shell moves in one direction with respect to said bushing.

STODDARD B. MARTIN.

REFERENCES CITED

The following references are of record in the file of this patent:

UNITED STATES PATENTS

| Number | Name | Date |
|---|---|---|
| 493,231 | Muir | Mar. 7, 1893 |
| 1,013,438 | Pash | Jan. 2, 1912 |
| 2,278,267 | Holmes | Mar. 31, 1942 |
| 2,299,972 | Gallen et al. | Oct. 27, 1942 |
| 2,341,744 | Sheffer | Feb. 15, 1944 |
| 2,343,364 | Bochenek | Mar. 7, 1944 |
| 2,363,890 | Martin | Nov. 28, 1944 |